Figure 1:
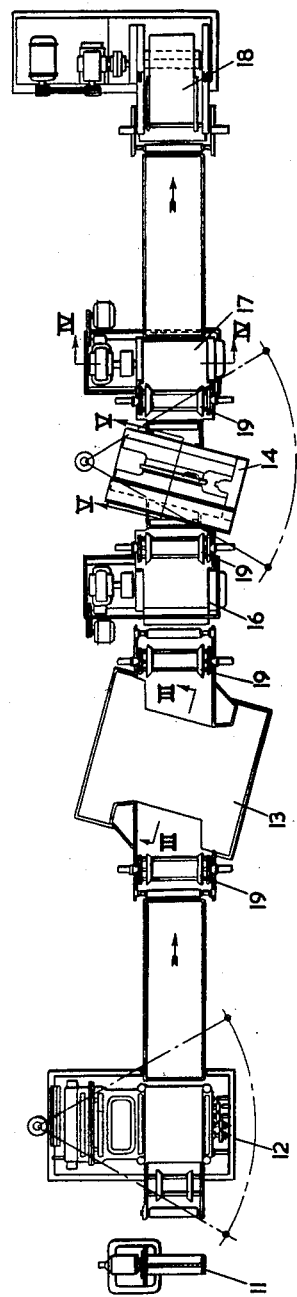

June 23, 1964  A. G. TOMKINS  3,137,936
FUSION WELDING

Filed Aug. 11, 1960  4 Sheets-Sheet 1

United States Patent Office 3,137,936
Patented June 23, 1964

3,137,936
FUSION WELDING
Alan G. Tomkins, Newcastle-upon-Tyne, England, assignor to The British Oxygen Company Limited, a British company
Filed Aug. 11, 1960, Ser. No. 48,985
Claims priority, application Great Britain Aug. 14, 1959
13 Claims. (Cl. 29—475)

This invention relates to the welding by fusion of butted workpieces of metal plate, sheet, or strip having a comparatively large coefficient of expansion.

In the production of butt welds in such workpieces it is the normal practice to support the weld metal at the rear of the weld seam by a backing member, which also serves to chill the weld metal along the length of the seam and to produce a good surface on the weld bead at the rear of the seam. One disadvantage that has been experienced when metals having a comparatively large coefficient of expansion are welded by fusion welding processes is that expansion of the workpiece causes the plate, sheet, or strip of metal to buckle away from the backing member, leading to a poor finish on the underside of the weld bead, and to lack of consistency in the chilling effect of the backing member.

According to the present invention a method of fusion welding butted workpieces of plate, sheet, or strip formed of a metal having a comparatively large coefficient of expansion, such as brass, in which a source of heat is moved along the edges to be joined on the side of the butted workpieces opposite to a weld backing member, is characterised in that, before welding, each metal plate, sheet, or strip is bent along a line substantially parallel to its edge to deform the portion of the plate, sheet, or strip between this line and the edge towards the weld backing member so that during welding substantially the entire width of each end portion is in line contact with the weld backing member. The backing member may be grooved to receive the deformed portions at the end of the metal strips to be welded.

The present invention is particularly applicable to a predominantly automatic process for welding together the ends of several brass strips to form a strip of greater length. In this process, coils of brass strip are straightened, joined at their ends using the process and apparatus of the invention, and rewound into larger coils. In automatic welding processes it is particularly desirable that the weld conditions, e.g. orientation and clamping of the strips to be welded with respect to the weld backing member, should be reproducible in successive welding operations in order to produce satisfactory and consistent welds. It is also desirable that the setting up of the strips in the welding position should be done automaticaly rather than manually by the operator.

According to another aspect of the present invention, a method of producing lengths of metal strip having a comparatively large coefficient of expansion from a series of shorter lengths of the strip by fusion welding comprises the steps of: feeding each shorter length of strip to a pressing and cutting position, pressing each end to be joined to bend it through a predetermined angle towards a weld backing member so that during welding substantially the entire width of each end portion is in line contact with the weld backing member, cutting each end to be joined to produce an edge suitable for butting, feeding the shorter lengths of strip to a welding position, clamping the shorter lengths of strip in the welding position, and joining the edges of the shorter lengths of strip together by a fusion welding process.

The feeding of the shorter lengths of brass strip to a welding position may be assisted by using a retractable stop and pinch rolls driven via a slipping clutch, one length of strip being fed until its end butts against this stop, the strip being then clamped, the stop being then removed and the other length of brass strip being fed until its end butts against the end of the first length of strip.

According to a further aspect of the present invention, apparatus for producing lengths of metal strip having a comparatively large coefficient of expansion by fusion welding the ends of a series of shorter strips comprises: strip feeding means arranged to feed each strip end to be joined to a pressing and cutting position, strip feeding means arranged to feed the cut strip ends to a welding position, one or more press and shear units arranged to bend the end of each strip along a line substantially parallel to the edge to be welded and through a predetermined angle towards a weld backing member and then to cut the end of each strip to produce edges suitable for butting so that during welding substantially the entire width of each end portion is in line contact with the weld backing member, positioning means arranged to locate the ends of the strips in the welding position, clamping means arranged to hold the strips against the weld backing member with the strip ends in the welding position, and a welding torch arranged to weld together the butting edges of the shorter strips.

The feeding means arranged to feed the cropped or cut strip ends to a welding position may comprise pinch rolls driven via a slipping clutch and these may also effect the feeding of the strip ends to the pressing and cutting position. Alternatively, the feeding of the strip ends to the pressing and cutting position may be done by main drive units of the installation which accomplishes the straightening, joining and re-coilng of the brass strip. The positioning means may comprise a retractable stop member which in its active position locates one end of a metal strip accurately beneath the welding head and in its retracted position is clear of the paths of movement of the strip and the welding head. In operation, one end of the strip being fed to the welding position by the pinch rolls butts against the retractable stop member, the drive then slips, holding the strip end firmly against the retractable stop member. The strip end is thus located in the welding position and is then clamped. The stop member is then retracted, and the second strip butted against the first in a similar way.

The welding process preferably used to join the ends of the strips is electric arc welding using a non-consumable electrode shielded by a stream of inert gas, but any welding process appropriate to the material of the strip may be used.

Figure 2:
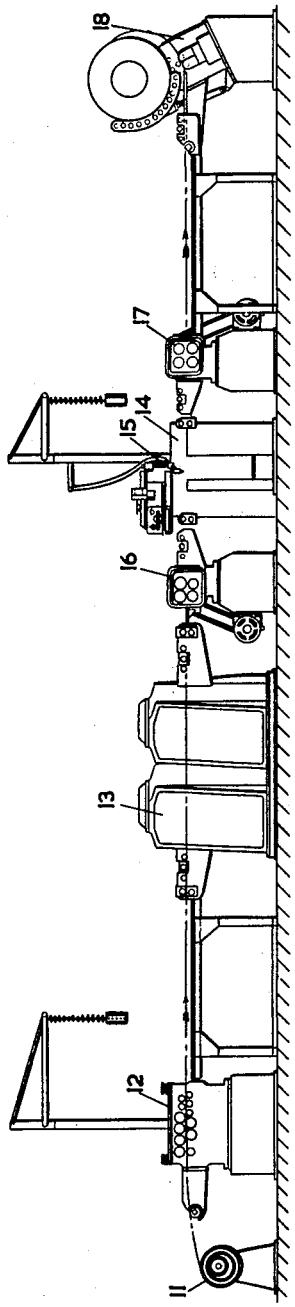
Figure 3:
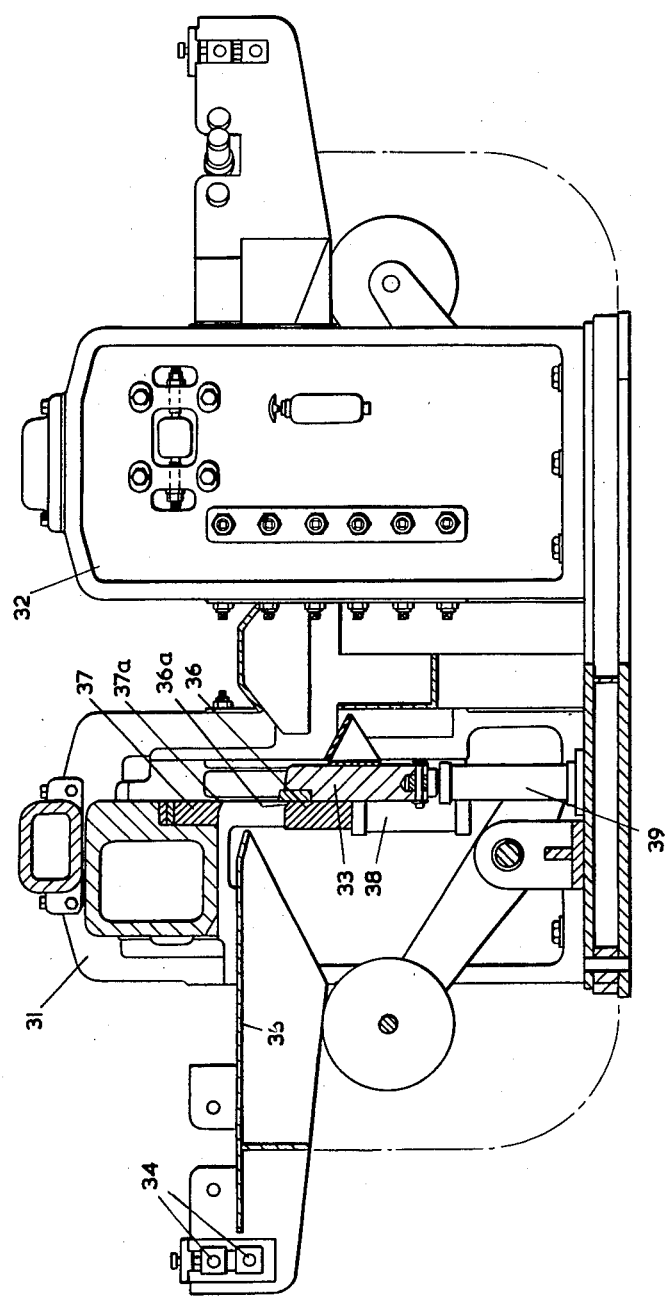
Figure 4:
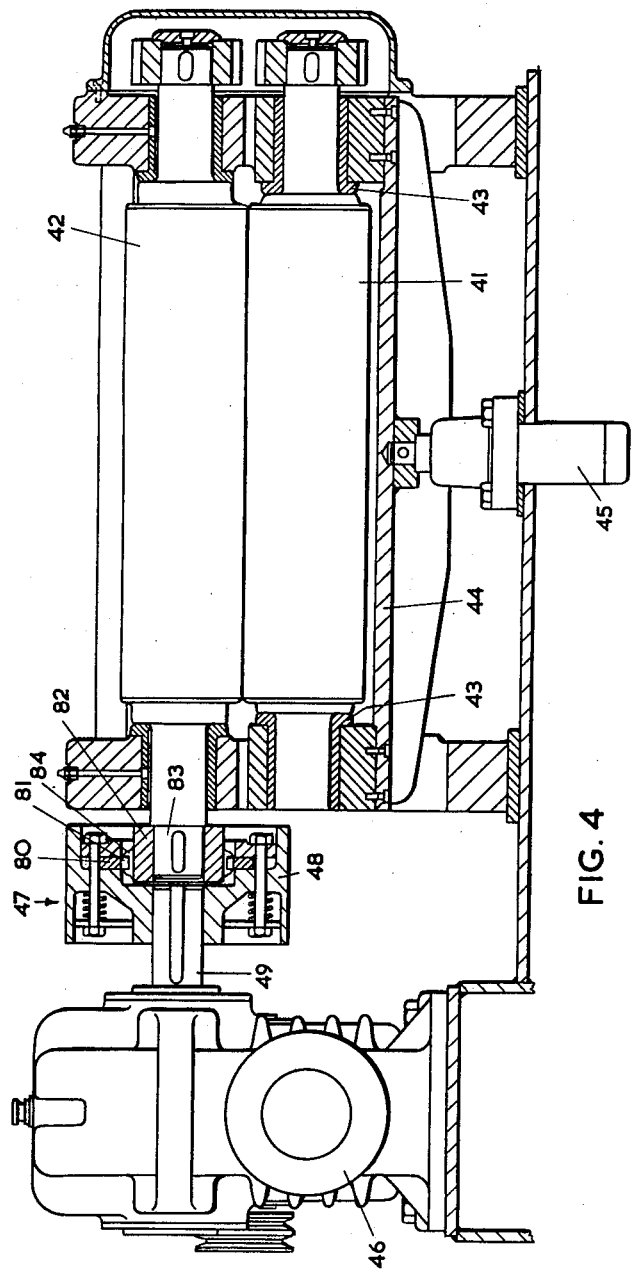
Figure 5:
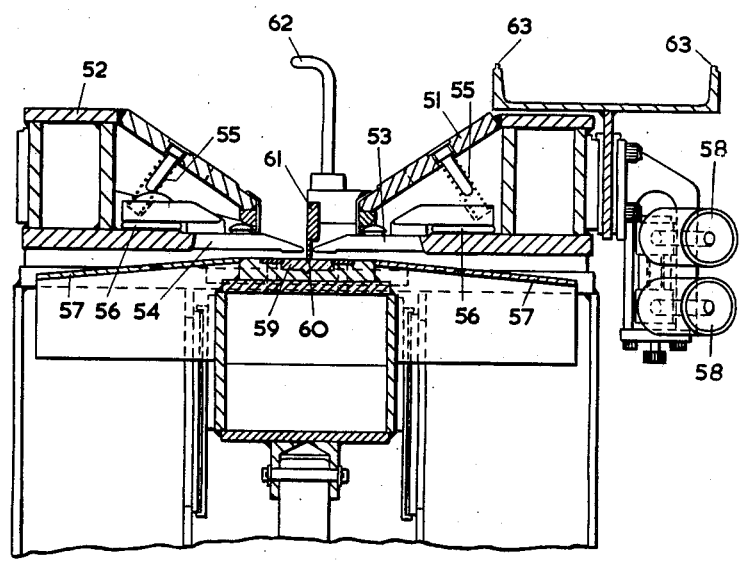
Figure 6:
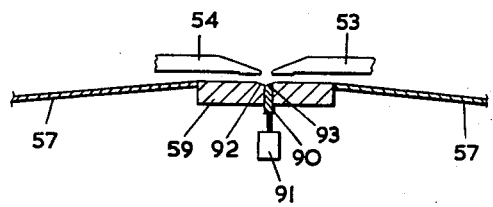

A particular embodiment of the invention in a brass strip production line will now be described with reference to the accompanying drawings in which FIG. 1 is a plan view of the brass strip production line through which the strip passes in a generally horizontal direction, FIG. 2 is a sectional view of the production line shown in FIG. 1, the section being taken in a vertical plane through the centre of the strip, FIG. 3 is a sectional view of the press and shear unit, the section being taken in a vertical plane through line III—III in FIG. 1, FIG. 4 is a sectional view of the assembly housing the pinch rolls for feeding the strip to the welding jig, the section being taken in a vertical plane at right angles to the direction of travel of the strip and through the line IV—IV in FIG. 1, FIG. 5 is a sectional view of the strip welding jig, taken in a vertical plane through the line V—V in FIG. 1, and FIG. 6 is a sectional view of part of an alternative strip welding jig, which includes a different construction of retractable stop, the sectional view corresponding to that of FIG. 5.

The brass strip coiling and welding production line is designed for handling coils of brass strip up to 18 inches wide and joining them by welding the ends of the coils together to form longer strips which are then recoiled into larger coils. The production line shown in FIGS. 1 and 2 comprises a decoiling machine 11, which may be of the free-running pintle type, a multi-roll straightening machine 12, a press and shear unit 13 which incorporates an edge setting device and a double cutting system, a strip welding jig 14, a welding head 15, two sets of pinch rolls 16 and 17, one set being located on each side of the welding jig 14, and a final coiling unit 18 which may be a three-roll up-coiler of conventional type. This final coiling unit may provide the master drive to the installation. During coiling the average strip speed is of the order of 30 feet per minute, and drive controls are provided so that creep feeding and inching the strip by means of the pinch rolls are possible when positioning for trimming and welding. Hydraulically operated side guides 19 are also provided.

The press and shear unit 13 and the welding jig 14 are arranged at an angle to the line of travel of the strip so that the resulting weld seam is not normal to the line of travel of the strip but is oriented at an angle from 70° to 90°, preferably 75°, to this line. This is because there is an increased load on any subsequent thickness-reducing rollers when the weld seam is normal to the direction of travel of the strip since the whole width of the weld bead across the strip passes through the rollers at once. When the weld seam is at a slight angle to the normal (i.e. 15° to the normal in this case) this wear-producing load on rollers is reduced. The press and shear unit 13 and the welding jig 14 are arranged so that the cut made by the shear blades is parallel to the direction of movement of the welding head 15.

The press and shear unit 13 is shown more fully in FIG. 3 and comprises two exactly similar sub-units 31 and 32, the upstream unit 31 housing an up-cut blade 33 which prepares the leading edge of a strip to be welded and the downstream unit 32 housing another up-cut blade (not shown) which prepares the trailing edge of the previous strip.

In an alternative strip welding production line, the press and shear unit 13 may be split into two similar halves, and the sub-units 31 and 32 may be placed one on the upstream side of the strip welding jig and the other on the downstream side. However, in the arrangement shown in FIG. 3, the strip is fed in along platform 35, guided by rollers 34, and is stopped with the end that is to be cropped placed between the blade 33 and the blade in the housing 32. The hydraulic cylinder 38 is then actuated, which causes the movable forming bar 36 to rise and press the brass strip against stationary forming bar 37. The working faces 36 and 37 of these bars are shaped at 36a and 37a such that a narrow strip at the end of the brass strip is turned down through an angle of approximately 5°, the fold line thus produced being substantially parallel to the edge to be welded and extending the whole width of the brass strip. Satisfactory results have been achieved with various angles from 3° to 10°. The forming bars 36 and 37 are dimensioned to give, after cropping of the ends of the shear blades, turned-down portions approximately $3/16$ inch wide at the ends of the strips. The hydraulic cylinder 39 is then actuated, causing the blade 33 to rise and crop the end of the strip. The upstream and downstream forming bars and blades may be operated individually or simultaneously if both strips have been positioned with their ends appropriately placed for forming and shearing. The scrap end of the strip falls clear and the forming bar 36 and the blade 33 are returned to their neutral positions, leaving the strip end prepared for welding and ready to be fed to the welding jig 14 by the pinch roll assemblies 16 and 17.

The strip welding jig 14 is shown in FIGURE 5 and includes two support frames 51 and 52 on which are mounted clamping bars 53 and 54. These clamping bars are held in the retracted position by the compression springs 55 attached to the frames 51 and 52 and are urged into clamping engagement with the brass strips when desired by inflation of the hoses 56. The jig is provided with platforms 57 to receive the leading end of one strip and the trailing end of another strip which is guided by rollers 58 as it approaches the jig. Only the pair of rollers 58 on the downstream side of the jig has been shown in the drawing, but a similar pair of rollers is provided on the upstream side for a similar purpose. Hydraulically operated side-guides (19 in FIG. 1 but not shown in FIG. 5) are provided on either side of the strip to line up the strip as it enters the welding jig. The distance between opposite side-guides can be adjusted to accommodate various widths of strip. A horizontal backing-bar 59 extends across the whole width of the welding jig beneath the tips of the clamping bars 53 and 54. The upper surface of the backing bar 59 may be flat except for a groove 60 to receive a retractable stop member 61 as is shown in FIG. 5 of the drawings, but preferably the backing bar 59 is suitably grooved to receive the ends of the brass strips which have been bent down in the press and shear unit 13. A groove which has been found to be suitable was $3/8$ inch wide by $1/8$ inch deep and of course extended across the whole width of the strip welding jig. In this case the distance between the clamping bars was also $3/8$ inch.

The retractable stop member 61 is pivotally mounted on the support frame 51 and extends the whole width of the jig covered by the strip. It has a handle 62 and can be pivoted from the active position in which it is shown in FIG. 5 to a retracted position where it is well clear of the movement of the brass strip and of the movement of the welding head. In the position shown in FIG. 5, the retractable stop member 61 locates the brass strip which is fed in to butt against it from the upstream side of the welding jig 14. When the sheared end of the brass strip butts against the stop 61, the brass strip is located accurately in the welding position, and it is then clamped by the bar 53 against the backing bar 59 by inflating the hose 56. The stop member 61 is then retracted and the trailing end of the second strip to be welded is then fed in from the downstream side of the jig to butt against the first strip already clamped and is then clamped by the bar 54 in the welding position. The welding head 15 is attached to a carriage (not shown in FIG. 5) which runs along horizontal rails 63 oriented exactly parallel to the line of the weld, and the butting brass strips are then welded by striking the welding arc and traversing the carriage on the rails. Any suitable welding process may be used, and the particular arrangements for starting the weld, controlling the arc, and finishing the weld are not relevant to the present invention. The preferred welding process for brass strip is the non-consumable electrode inert gas shielded process.

The brass strip is fed from the upstream side of the jig by the upstream pinch roll assembly 16, which is exactly similar in construction to the downstream pinch roll assembly 17 shown in detail in FIG. 4.

The pinch roll assembly comprises coaxial cylindrical rolls 41 and 42, arranged one above the other. The lower roll is an idler roll and is journalled in bearings 43 which are mounted in a frame 44 which can be raised or lowered by hydraulic operation of a piston in a cylinder 45. The gap between the rolls can thus be adjusted to accommodate various thicknesses of strip, and the pressure exerted on the strip by the pinch rolls 41 and 42 can also be adjusted. The upper roll 42 is driven through reduction gears by an electric motor 46, and it is a feature of the present invention that the drive is transmitted to the pinch roll 42 via a slipping clutch 47. This clutch 47 consists of an annular shell 48 attached to the shaft 49 which is driven by the electric motor, an annular friction member 80 fixedly attached to the interior of this shell and a series of roller bearings 81, each bearing carried on a spindle (not shown) which is attached to a bracket 84: these brackets 84 being attached at intervals around the periphery of a sleeve 82 on the shaft 83 of the pinch roll 42. The roller bearings 81 are in contact with the annular friction member 80, and when the shaft 49 is driven the friction between member 80 and the roller bearings 81 and the friction between these bearings and their spindles attached to brackets 84 cause the shaft 83 and therefore the pinch roll 42 to rotate and feed the brass strip as required. When the feed of the brass strip is obstructed, for instance by butting against the leading edge of a brass strip already clamped in the strip welding jig 14 as previously described, the rotation of pinch roll 42 is stopped and the clutch slips, shaft 49 and therefore friction member 80 continuing to rotate, while bearings 81 rotate freely on their spindles, and the brackets 84 remain stationary. The upstream pinch roll assembly 16 operates in a similar manner, the clutch slipping when the brass strip butts against the retractable stop member 61 as previously described.

An alternative construction of weld backing member and retractable stop member in the strip welding jig is shown in FIGURE 6. The welding jig partially shown in FIG. 6 is substantially the same as that shown in FIG. 5, and similar parts have been given the same reference numerals. The backing bar 59 has a groove of V cross-section to receive the turned-down ends of the brass strips. At intervals across the width of the jig, stop members 90 are provided which have a stop surface 93 which is flush with the backing bar in the retracted position shown in the drawing. These stop members 90 are raised by a hydraulic cylinder 91 when brass strip is to be fed into the jig by the upstream pinch rolls, and the stops 90 then project upward from the backing bar 59 and locate the brass strip in the welding position ready for clamping by the bar 54.

The production line described herein is particularly intended for processing brass strip to the following specification:

Composition: 64% Copper, 32% Zinc to 90% Copper, 10% Zinc
Thickness: 0.080 to 0.125 inch
Width: 4 to 18 inches
Hardness: Maximum 200 V.P.N.
Ultimate Tensile Strength: Maximum 40 tons per sq. inch.

and small coils of such brass strip having a length of 80 to 90 feet, and up to 5 cwts. in weight may be joined to produce finished coils of roughly 15 to 16 cwts. in weight. It will be apparent, however, that the application of the invention is not restricted to the joining of the brass strip detailed in the specification in this paragraph, and the invention may be applied to the joining by fuson welding of any material having a comparatively large coefficient of expansion. It is expected, however, that the invention will be applied chiefly to metals having a coefficient of linear expansion greater than approximately .000014 per ° C., since it is these materials whose expansion presents the greater difficulties, particularly in automatic welding.

I claim:

1. A method of fusion welding butted workpieces of plate-like form of a metal having a comparatively large coefficient of expansion such as brass, in which a welding torch is moved along a welding seam defined by the edges to be welded on the side of the workpieces opposite to a chill type backing member characterized in that before welding each workpiece is bent along a line substantially parallel to its edge to deform the portion of the workpiece between this line and the edge toward the side of the workpiece which is in contact with the backing member during welding, and in that the workpieces are clamped into the welding position along regions which are spaced on each side of the welding seam closely adjacent to the seam so that during welding substantially the entire length of each edge to be welded is in line contact with the weld backing member.

2. A method of fusion welding according to claim 1 wherein each workpiece is bent so that the portion between the line of bend and the edge to be welded lies substantially in one plane oriented at from 3 to 10 degrees to the plane occupied by the adjacent portion of the workpiece.

3. A method of fusion welding according to claim 2 wherein each workpiece is bent so that the portion between the line of bend and the edge to be welded lies substantially in one plane oriented at 5 degrees to the plane occupied by the adjacent portion of the workpiece.

4. A method of producing lengths of metal strip having a comparatively large coefficient of expansion from a series of shorter lengths of the strip by fusion welding comprising the steps of feeding each shorter length of strip to a pressing and cutting position, pressing each end to be joined to bend it through a predetermined angle toward the side of the strip which is in contact with a chill type backing member during welding, cutting each end to be joined to produce an edge suitable for butting, feeding the shorter lengths of strip to a welding position in which the edges define a welding seam, clamping the shorter lengths of strip in the welding position along regions which are spaced on each side of the welding seam closely adjacent to the seam so that during welding substantially the entire length of each edge to be welded is in line contact with the weld backing member, and welding the edges together by a fusion welding process using a welding torch.

5. A method according to claim 4 wherein the feeding of the shorter lengths of strip to a welding position and clamping them in this position includes the steps of feeding one shorter length of strip until its end butts against a retractable stop member by means of rolls driven via a slipping clutch, clamping the strip thus located in the welding position, withdrawing the retractable stop member, feeding a second shorter length of strip until its end butts against the end of the first length of strip by means of rolls driven via a slipping clutch, and clamping the second length of strip thus located in the welding position.

6. Apparatus for producing lengths of metal strip having a comparatively large coefficient of expansion by fusion welding the ends of a series of shorter strips which comprises first strip feeding means arranged to feed each strip end to be joined to a pressing and cutting position, at least one press and shear unit arranged firstly to bend the end of each strip along a line substantially parallel to the edge to be welded and through a predetermined angle toward the side of the strip which is in contact with a chill type backing member during welding, and then to cut the end of each strip to produce edges suitable for butting, second strip feeding means arranged to feed the cut strip ends to a welding position, positioning means arranged to locate the ends of the strip in the welding position so that the two ends define a welding seam, clamping means arranged to clamp the strips in the welding position along regions which are spaced on each side of the welding seam closely adjacent to the seam so that during welding substantially the entire length of each edge to be welded is in line contact with the weld backing member, and a welding torch arranged to weld together the ends defining the welding seam.

7. Apparatus according to claim 6 wherein the second strip feeding means comprises pinch rolls driven via a slipping clutch.

8. Apparatus according to claim 6 wherein the weld backing member is provided with a groove adapted to receive the portion of each strip bent through a predetermined angle.

9. Apparatus according to claim 6 wherein the positioning means comprises a retractable stop member which is movable between an active position where it acts as an end-stop to strip being fed to the welding position and a retracted position where it is clear of the paths of movement of the strip and the welding torch.

10. Apparatus according to claim 9 wherein the clamping means and the weld backing member are attached to a welding jig structure and wherein the retractable stop member is pivoted on the welding jig structure to move between its active and its retracted positions.

11. Apparatus according to claim 9 wherein the retractable stop member projects upwardly from the weld backing member in the active position and is housed in a hole provided in the weld backing member in the retracted position.

12. Apparatus according to claim 11 wherein the upper end of the retractable stop member is flush with the surface of the weld backing member in the retracted position.

13. Apparatus according to claim 6 wherein at least one press and shear unit includes a stationary forming bar and a movable forming bar, these forming bars having co-operating working faces shaped to effect the desired bending down of the strip end through a predetermined angle.

References Cited in the file of this patent

UNITED STATES PATENTS

| | | |
|---|---|---|
| 468,586 | Walsh | Feb. 9, 1892 |
| 735,936 | Blakey | Aug. 11, 1903 |
| 2,148,234 | Debor | Feb. 21, 1939 |
| 2,196,941 | Reed et al. | Apr. 9, 1940 |
| 2,203,151 | Iversen | June 4, 1940 |

FOREIGN PATENTS

| | | |
|---|---|---|
| 473,333 | France | Jan. 8, 1915 |
| 201,055 | Switzerland | Nov. 15, 1938 |